United States Patent
Kim et al.

(10) Patent No.: US 7,486,897 B2
(45) Date of Patent: Feb. 3, 2009

(54) POLARIZATION DUOBINARY OPTICAL TRANSMITTER

(75) Inventors: Hoon Kim, Suwon-si (KR); Seong-Taek Hwang, Pyeongtaek-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 496 days.

(21) Appl. No.: 11/371,737

(22) Filed: Mar. 9, 2006

(65) Prior Publication Data

US 2006/0216039 A1    Sep. 28, 2006

(30) Foreign Application Priority Data

Mar. 28, 2005   (KR)  .................... 10-2005-0025450

(51) Int. Cl.
    *H04B 10/04*   (2006.01)
(52) U.S. Cl. .................... 398/183; 398/184; 398/185; 398/186; 398/187; 398/188; 398/193; 398/194; 398/200; 398/201; 398/65; 398/152; 398/147; 398/158; 398/159; 385/1; 385/3; 385/39; 385/24; 385/11; 356/364; 356/365; 356/73.1; 356/367; 356/368; 359/246; 359/249
(58) Field of Classification Search .............. 398/182, 398/183, 184, 185, 186, 187, 188, 189, 192, 398/193, 194, 200, 201, 158, 159, 152, 65, 398/81, 147; 385/1, 3, 39, 24, 11; 356/364, 356/365, 399, 73.1, 367, 368; 359/246, 249, 359/484, 499
See application file for complete search history.

(56) References Cited

U.S. PATENT DOCUMENTS 6,097,525 A * 8/2000 Ono et al. .................... 398/185
6,304,353 B1 * 10/2001 Gehlot .......................... 398/185

FOREIGN PATENT DOCUMENTS

| JP | 2000-312184 | 11/2000 |
| JP | 2003-348022 | 12/2003 |
| JP | 2004-070130 | 3/2004 |
| JP | 2004-235988 | 8/2004 |
| JP | 2005-006323 | 1/2005 |
| JP | 2005-269648 | 9/2005 |

OTHER PUBLICATIONS

Siddiqui, A. Shamim, et al; "Dispersion-Tolerant Transmission Using a Duobinary Polarization-Shift Keying Transmission Scheme;" IEEE Photonics Technology Letters, vol. 14, No. 2; Feb. 2002.

* cited by examiner

*Primary Examiner*—Hanh Phan
(74) *Attorney, Agent, or Firm*—Cha & Reiter, LLC

(57) ABSTRACT

A polarization duobinary optical transmitter is disclosed. The transmitter includes a precoder for coding an electric signal and a light source for generating continuous light. The transmitter also includes a chirped-free modulator for generating an NRZ signal including first and second polarization light beams orthogonal to each other by modulating the light with the electric signal and a band-pass filter for limiting neighbor frequency bands between the first and second polarization light beams.

10 Claims, 4 Drawing Sheets

POLARIZATION DUOBINARY OPTICAL TRANSMITTER

CLAIM OF PRIORITY

This application claims priority to an application entitled "Polarization Duobinary Optical Transmitter," filed in the Korean Intellectual Property Office on Mar. 28, 2005 and assigned Ser. No. 2005-25450, the contents of which are hereby incorporated by reference.

BACKGROUND OF THE INVENTION

1. Field of the Invention

The present invention relates to an optical transmitter for an optical communication system, and more particularly to an optical transmitter using a polarization duobinary modulation scheme.

2. Description of the Related Art

A polarization duobinary optical signal is a binary signal having bits of '1' and '0'. A '1' bit is represented by two orthogonal polarization components each having an amplitude of 1. A '0' is represented by the state at which the amplitude is zero.

The polarization duobinary optical signal can be generated by a typical transmitter for a conventional On-Off Keying (OOK) type optical communication system. It has a high resistance to a narrow signal bandwidth and a non-linear distortion of an optical fiber. The polarization duobinary optical signal has a spectrum narrower than that an OOK signal or an Amplitude Modulated Phase Shift Keying (AM-PSK) duobinary optical signal. This means that the polarization duobinary optical signal can be used for a high density Wavelength Division Multiplexing (WDM) optical communication system. Although all bits of the OOK signal or AM-PSK signal have the same polarization, '1' bits of the polarization duobinary optical signal have orthogonal polarities. Therefore, the polarization duobinary optical signal is less susceptible to non-linear distortion of an optical fiber than signals based on other communication schemes.

FIG. 1 is a block diagram illustrating a structure of a conventional optical transmitter 100 for generating a polarization duobinary optical signal. The conventional optical transmitter 100 includes a differential precoder 110 for coding, dividing and outputting a binary Non-Return-to-Zero (NRZ) electric signal, a phase inverter 150 for inverting a phase of one of the electric signals divided by the precoder 110, first and second half-wave rectifier 130 and 170, first and second duobinary filter 120 and 160, first and second optical intensity modulator 140 and 180, and a Mach-Zehnder modulation unit 190.

An electric signal input to the polarization duobinary optical transmitter 100 is different from an internal signal for driving the optical transmitter 100. Therefore, the precoder 110 codes and divides the electric signal and then outputs divided signals, in order to align the electric signal with the internal signal.

The phase inverter 150 is disposed between the precoder 110 and the second duobinary filter 160. The phase inverter 150 inverts a phase of one of the divided signals and outputs the phase-inverted signal to the second duobinary filter 160.

Each of the first and second duobinary filter 120 and 160, which may be a low pass filter having a bandwidth of 0.25× transmission speed, converts the applied binary signals to ternary signals each having three logical levels of +1, 0 and −1 and then outputs the converted ternary signals. The first duobinary filter 120 is disposed between the precoder 110 and the first half-wave rectifier 130.

Each of the first and second half-wave rectifier 130 and 170 filters negative bits of the ternary signals from the first and second duobinary filter 120 and 160. The positive bits pass through the rectifier. As a result, the signals are converted back to binary signals each having bits of only +1 and 0 while passing through the first and second half-wave rectifier 130 and 170.

After passing through the first and second half-wave rectifier 130 and 170, each of the signals passes through a corresponding driver and is then input to the first optical intensity modulator 140 or the second optical intensity modulator 180.

The Mach-Zehnder modulation unit 190 includes a polarization maintaining optical fiber 191, a polarization maintaining beam splitter 192 and first and second Mach-Zehnder modulator 193 and 194. The polarization maintaining beam splitter 192 separates interferential light beams, which have been sequentially generated and input through the polarization maintaining optical fiber 191, into horizontal polarized light beams and vertical polarized light beams. The resultant signals are then output to the first Mach-Zehnder modulator 193 and the second Mach-Zehnder modulator 194, respectively.

The first Mach-Zehnder modulator 193 receives from the first optical intensity modulator 140 an electric signal having a phase which has not been inverted. This electric signal is modulated with a corresponding polarization light beam, and then output. The second Mach-Zehnder modulator 194 receives from the second optical intensity modulator 180 an electric signal having an inverted phase. This electric signal is modulated with a corresponding polarization light beam, and then output. As a result, the Mach-Zehnder modulation unit 190 generates and outputs a polarization duobinary optical signal.

FIG. 2 is a graph illustrating an example of the polarization duobinary optical signal. As noted from FIG. 2, the polarization duobinary optical signal includes X-axis polarization components and Y-axis polarization components which are orthogonal to each other.

However, in order to generate a polarization duobinary optical signal, it is necessary for the conventional transmitter to have a plurality of separate components for modulating each of the orthogonal polarization components. Therefore, the conventional polarization duobinary optical transmitter has a complicated and redundant construction which increases the volume and price of the transmitter. Further, the conventional polarization duobinary optical transmitter is problematic in that it has a symmetric construction which degrades the reliability and reproducibility of the generated polarization duobinary optical signal.

SUMMARY OF THE INVENTION

One aspect of the present invention relates to a polarization duobinary optical transmitter that has a simplified structure as compared to conventional transmitters. Another aspect of the present invention relates to a polarization duobinary optical transmitter that can be manufactured with at a lower cost as compared to conventional transmitters.

One embodiment of the present invention is directed to a polarization duobinary optical transmitter including a precoder for coding an electric signal, a light source for generating continuous light, a chirped-free modulator for generating an NRZ signal including first and second polarization light beams orthogonal to each other by modulating the light with the electric signal and a band-pass filter for limiting neighbor frequency bands between the first and second polarization light beams.

BRIEF DESCRIPTION OF THE DRAWINGS

The above and other aspects, features and embodiments of the present invention will be more apparent from the following detailed description taken in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configurations incorporated herein will be omitted as it may obscure the subject matter of the present invention.

Figure 1:
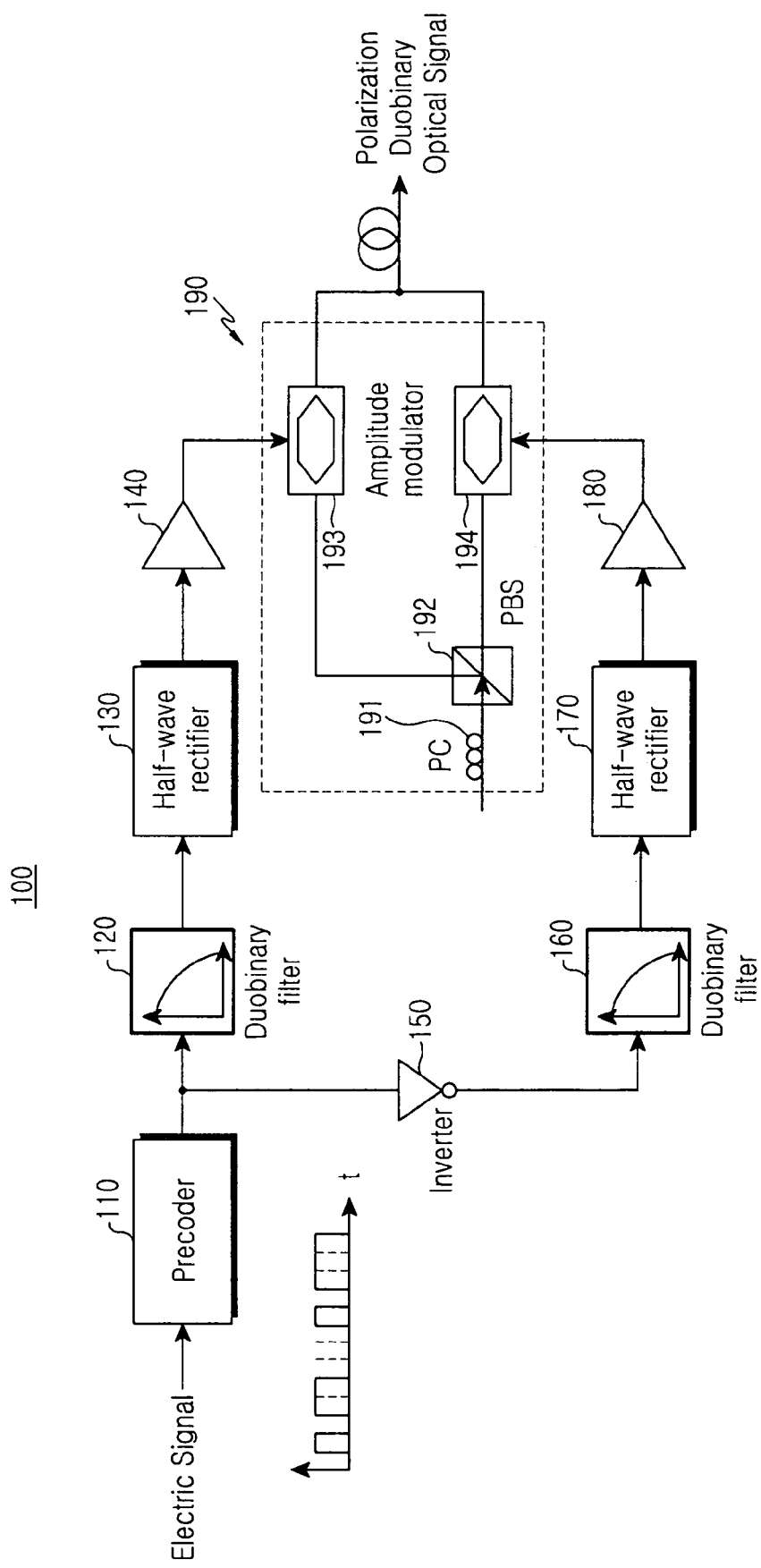
FIG. 1 is a block diagram illustrating a structure of a conventional optical transmitter for generating a polarization duobinary optical signal.
Figure 2:
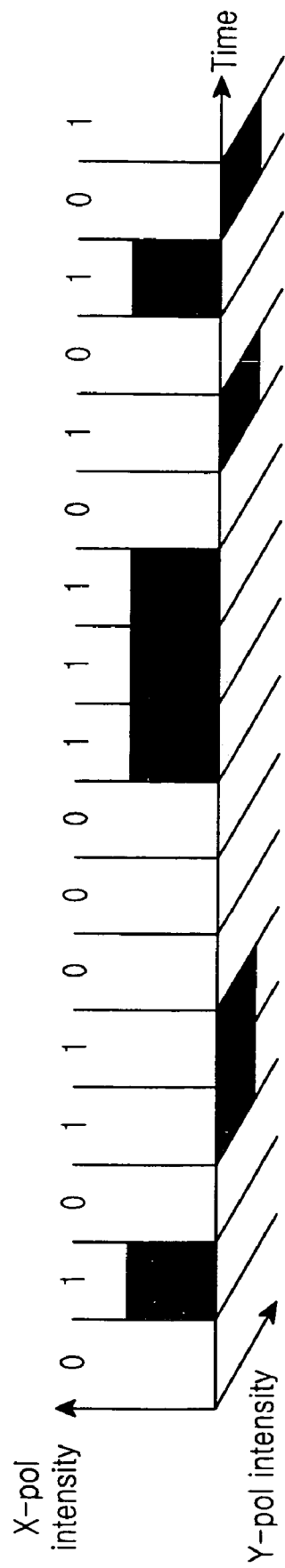
FIG. 2 is a graph illustrating an example of the polarization duobinary optical signal.
Figure 3:
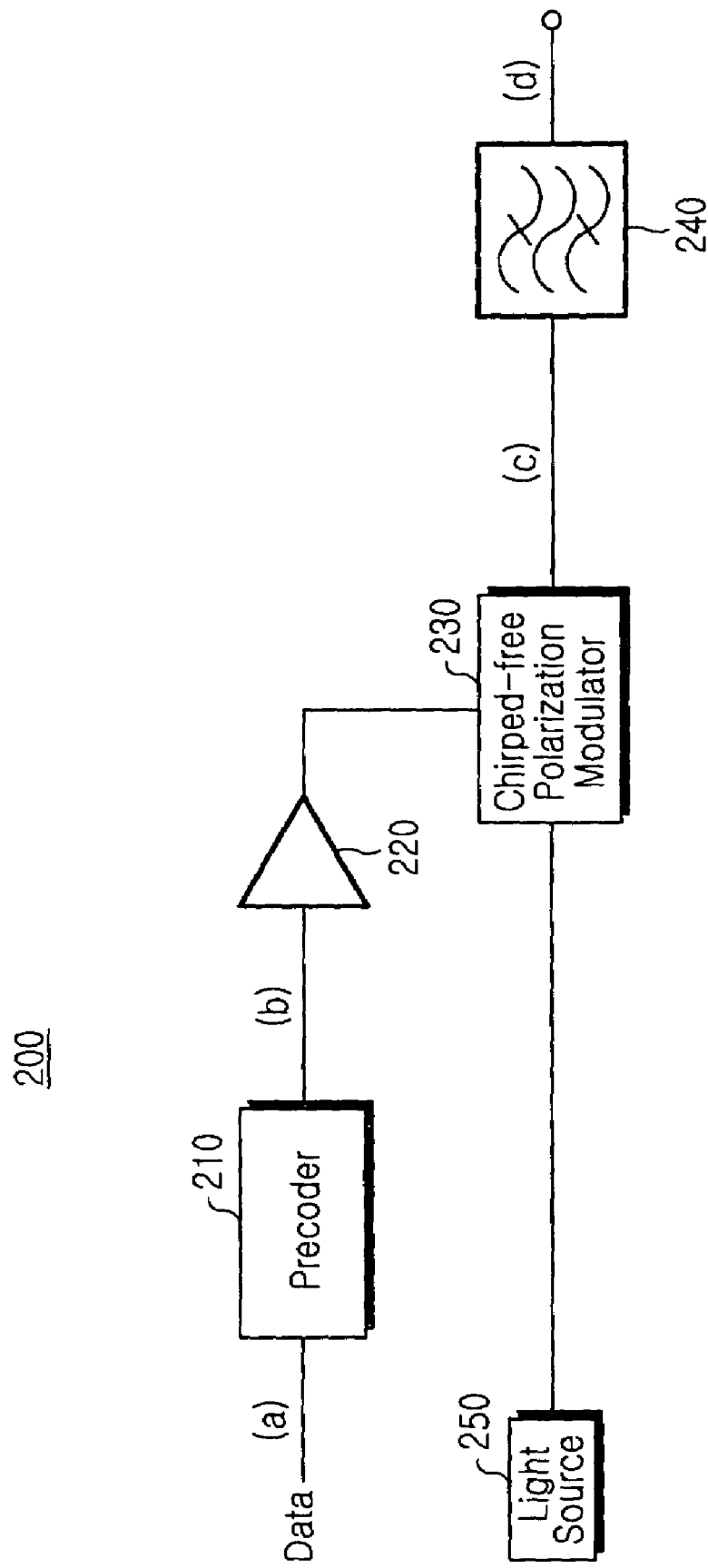
FIG. 3 is a block diagram illustrating a structure of a polarization duobinary optical transmitter 200 according to an embodiment of the present invention.

FIG. 3 is a block diagram illustrating a structure of a polarization duobinary optical transmitter 200 according to an embodiment of the present invention. FIGS. 4A through 4D are graphs illustrating examples of bit patterns of an NRZ signal in order to describe the operation of the polarization duobinary optical transmitter shown in FIG. 3.

The polarization duobinary optical transmitter 200 includes a precoder 210 for coding an electric signal, a light source 250 for generating a continuous light beam, a chirped-free polarization modulator 230 for modulating the light beam with the electric signal, thereby generating an NRZ signal including first and second polarization light beams orthogonal to each other, a band-pass filter 240 for limiting neighbor frequency bands between the first and second polarization light beams, and an amplifier 220 disposed between the precoder 210 and the chirped-free polarization modulator 230.

Figure 4:
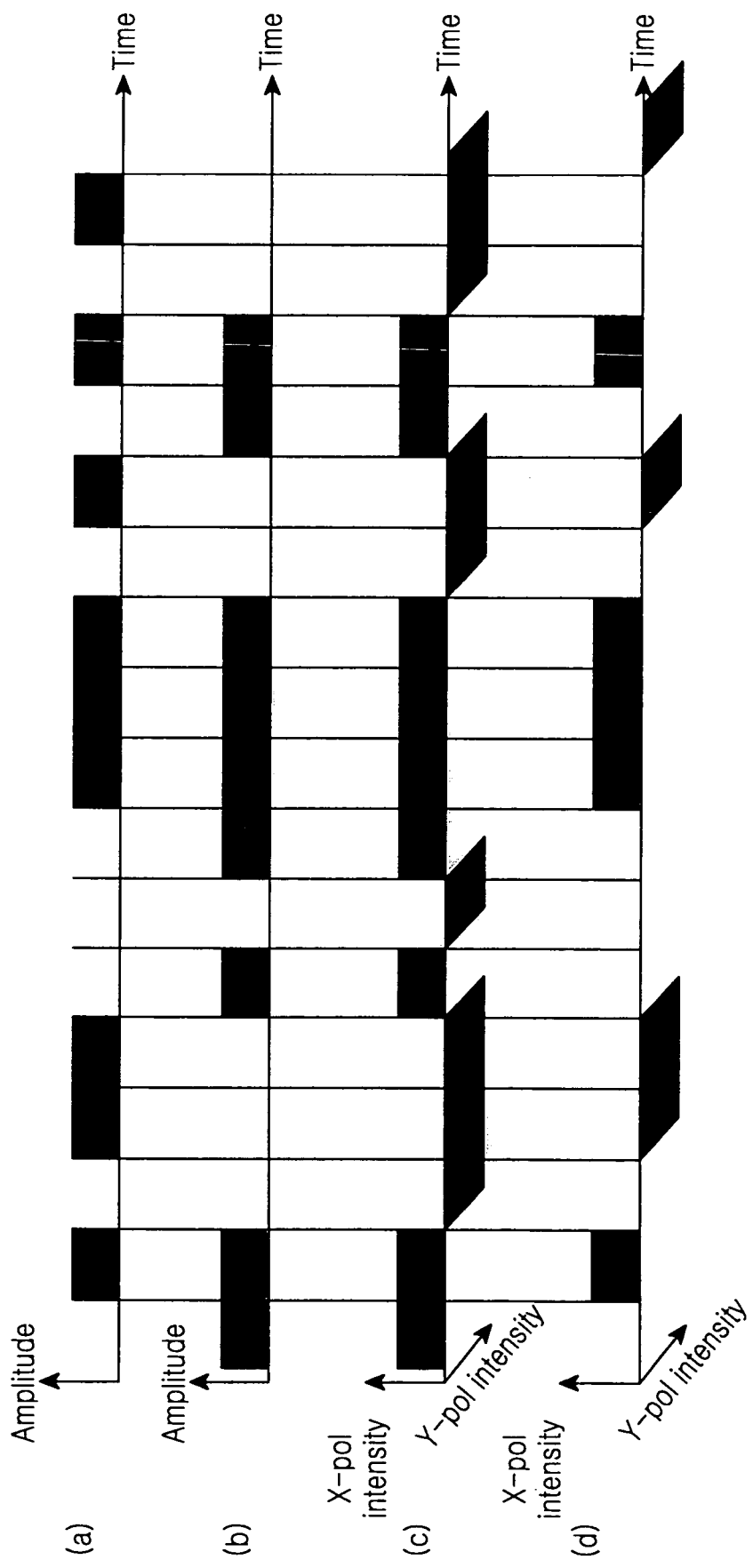
FIGS. 4A through 4D are graphs illustrating examples of bit patterns of an NRZ signal in order to describe the operation of the polarization duobinary optical transmitter shown in FIG. 3.

The precoder 210 may include a one-bit delay element or an OR gate and encodes and outputs the data in the form of the electric signal input to the transmitter. FIG. 4A illustrates an NRZ electric signal input to the precoder 210, and FIG. 4B illustrates an electric signal output from 310 after being encoded therein. The electric signal having the pattern as shown in FIG. 4B is amplified by the amplifier 220 and is then input to the chirped-free polarization modulator 230.

The chirped-free polarization modulator 230 is also called a polarization mode converter and can be manufactured by using semiconductor materials such as AlGaAs/GaAs or InP. A typical LiNbO$_3$ based polarization modulator performs phase-modulation for only the polarization component coinciding with the polarization axis of LiNbO$_3$ from among two orthogonal polarization components. The polarization modulation is thus performed having a chirp. However, in the chirped-free polarization modulator 230, one of the two orthogonal polarization components has an increasing phase and the other has a decreasing phase. This offsets the chirping. Therefore, the chirped-free polarization modulator 230 according to this embodiment of present invention modulates the NRZ electric signal with the light beam and generates an NRZ signal including first and second polarization light beams orthogonal to each other. FIG. 4C is a graph illustrating the NRZ signal generated by the chirped-free polarization modulator 230. It is noted from FIG. 4C that the NRZ signal includes first and second polarization light beams which are orthogonal to each other and repeatedly cross each other. The level of the electric signal applied to the chirped-free polarization modulator 230 determines the polarization state of the NRZ signal.

The band-pass filter 240 can generate an NRZ signal having a bit pattern of "01011000111010101" as shown in FIG. 4D by limiting neighbor frequency bands between the first and second polarization light beams. Further, the band-pass filter 240 should have a bandwidth that is narrow enough to eliminate the band for change between the polarization components (i.e. the boundary portion between the first and second polarization beams) and is wide enough to process the high speed NRZ signal. Therefore, the band-pass filter 240 may include a narrow band band-pass filter having a bandwidth 0.5~1.5 times as wide as the transmission speed of the NRZ signal.

In the graph shown in FIG. 4C, the transition areas between the first and second polarization light beams are portions at each of which the frequency of the signal largely changes in short time and thus a large frequency transition occurs. The band-pass filter 240 eliminates the bands at which the large frequency transition occurs and generates a signal pattern including "0" bits as shown in FIG. 4D.

As described above, a narrow band band-pass filter may be used as a multiplexing filter in a WDM optical communication system. Therefore, it is possible to construct a WDM optical communication system without an additional band-pass filter by employing a polarization duobinary optical transmitter 200 according to embodiments of present invention.

As the light source 250, a laser light source capable of generating continuous interferential light may be used.

In this way, a polarization duobinary optical transmitter can be constructed without including a plurality of high speed electric devices such as a duobinary filter, a half-wave rectifier, as required by conventional transmitters. Therefore, the manufacturing costs can be reduced, as well as improving the manufacturing efficiency. In addition, an optical transmitter according to embodiments of the present invention neither requires bias control nor has a symmetric construction, so that the transmitter has improved reliability and reproducibility.

While the invention has been shown and described with reference to certain embodiments thereof, it will be understood by those skilled in the art that various changes in form and details may be made therein without departing from the spirit and scope of the invention as defined by the appended claims.

What is claimed is:

1. A polarization duobinary optical transmitter comprising:
   a precoder arranged to code an electric signal;
   a light source arranged to generate light;
   a chirped-free modulator arranged to generate an NRZ signal including first and second polarization light beams orthogonal to each other by modulating the light with the coded electric signal; and
   a band-pass filter for limiting neighbor frequency bands between the first and second polarization light beams.

2. A polarization duobinary optical transmitter as claimed in claim 1, wherein the band-pass filter includes a narrow band band-pass filter having a bandwidth 0.5~1.5 times as wide as a transmission speed of the NRZ signal.

3. A polarization duobinary optical transmitter as claimed in claim 1, further comprising an amplifier disposed between the precoder and the chirped-free polarization modulator in order to amplify the coded electric signal.

4. A polarization duobinary optical transmitter as claimed in claim 1, wherein the precoder includes a one-bit delay element or an OR gate.

5. A polarization duobinary optical transmitter as claimed in claim 1, wherein the light source includes a pulse generator for generating a pulse signal.

6. A method for generating a polarization duobinary optical signal, the method comprising the steps of:

coding an electric signal;

generating light;

modulating the light with the coded electric signal to generate an NRZ signal including first and second polarization light beams orthogonal to each other; and filtering neighbor frequency bands between the first and second polarization light beams.

7. A method as claimed in claim 6, wherein the filtering is performed using a narrow band band-pass filter having a bandwidth 0.5~1.5 times as wide as a transmission speed of the NRZ signal.

8. A method as claimed in claim 6, further comprising the step of amplifying the coded electric signal before modulation.

9. A method as claimed in claim 6, wherein the coding step includes delaying an input signal by one-bit or OR gating the input signal.

10. A method as claimed in claim 6, wherein the generating step includes generating a pulse light signal.

* * * * *